US012710946B2

(12) United States Patent
Haasch

(10) Patent No.: US 12,710,946 B2
(45) Date of Patent: Aug. 18, 2026

(54) METHODS AND SYSTEMS FOR CREATING UNIQUELY IDENTIFIABLE SOFTWARE INSTALLATIONS

(71) Applicant: Siemens Aktiengesellschaft, Munich (DE)

(72) Inventor: Axel Haasch, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 18/023,016

(22) PCT Filed: Aug. 12, 2021

(86) PCT No.: PCT/EP2021/072434
§ 371 (c)(1),
(2) Date: Feb. 24, 2023

(87) PCT Pub. No.: WO2022/043068
PCT Pub. Date: Mar. 3, 2022

(65) Prior Publication Data

US 2023/0350659 A1 Nov. 2, 2023

(30) Foreign Application Priority Data

Aug. 26, 2020 (EP) .................................... 20192875

(51) Int. Cl.
*G06F 8/61* (2018.01)
*H04L 9/08* (2006.01)
*H04L 9/30* (2006.01)

(52) U.S. Cl.
CPC .............. *G06F 8/61* (2013.01); *H04L 9/0861* (2013.01); *H04L 9/3066* (2013.01)

(58) Field of Classification Search
CPC ........ G06F 8/61; H04L 9/0861; H04L 9/3066
See application file for complete search history.

(56) References Cited

U.S. PATENT DOCUMENTS 7,051,211 B1 5/2006 Matyas, Jr. et al.
8,250,569 B1 * 8/2012 Badenell ................ G06F 21/51 717/174

(Continued)

FOREIGN PATENT DOCUMENTS

CN 1682488 A 10/2005
CN 103460195 A 12/2013

(Continued)

OTHER PUBLICATIONS

Origines Jr, Domingo V. et al.; "A Secured RFID Lightweight Authentication Protocol based on Elliptic Curve Cryptography using modified PRNG Algorithm", Computing and Big Data, ACM, 2 Penn Plaza, Suite 701 New YORKNY10121-0701 USA, 18. Oct. 2019 (Oct. 2019), pp. 73-80, XP058447792, DOI: 10.1145/3366650.3366664 ISBN: 978-1-4503-7290-9.

(Continued)

*Primary Examiner* — Andrew M. Lyons
(74) *Attorney, Agent, or Firm* — Henry M. Feiereisen LLC

(57) ABSTRACT

Methods for generating a uniquely identifiable software installation are disclosed, A key pair of a private and a public key is generated for a software installation installed on a machine-readable medium. Random numbers supplemented with installation-specific data of the software installation are used to generate the key pair and the generated private key is securely stored. Also, a system, computer program, apparatus, machine readable data medium, and a data medium signal.

22 Claims, 3 Drawing Sheets

(56) References Cited

U.S. PATENT DOCUMENTS

| | | | | |
|---|---|---|---|---|
| 9,268,548 | B1 * | 2/2016 | Bos | G06F 8/65 |
| 11,706,025 | B2 * | 7/2023 | Nix | H04W 12/0431 713/171 |
| 2003/0037242 | A1 | 2/2003 | Yasuna | |
| 2006/0153368 | A1 | 7/2006 | Beeson | |
| 2006/0236111 | A1 | 10/2006 | Bodensjo et al. | |
| 2008/0008316 | A1 | 1/2008 | Pilipchuk | |
| 2013/0318357 | A1 | 11/2013 | Abraham | |
| 2018/0167211 | A1 | 6/2018 | Falk et al. | |
| 2018/0323973 | A1 * | 11/2018 | Soukharev | G06F 7/725 |
| 2019/0097794 | A1 * | 3/2019 | Nix | H04L 9/3249 |
| 2019/0155271 | A1 * | 5/2019 | Matthews | G05B 15/02 |
| 2019/0318130 | A1 * | 10/2019 | Ghosh | H04L 9/003 |
| 2020/0264862 | A1 * | 8/2020 | Bartolotta | G06F 8/65 |
| 2021/0090730 | A1 * | 3/2021 | Patel | G16H 40/60 |
| 2022/0094670 | A1 * | 3/2022 | Pelage | H04L 9/008 |

FOREIGN PATENT DOCUMENTS

| | | | |
|---|---|---|---|
| CN | 107735982 A | 2/2018 | |
| CN | 110210189 A | 9/2019 | |
| CN | 108628616 B * | 2/2022 | G06F 8/61 |

OTHER PUBLICATIONS

Selimis, Georgios et al.; "RESCURE a security solution for IoT life cycle", Proceedings of the 15th International Conference on Availability, Reliability and Security, ACMPUB27, New York, NY, USA, Aug. 25, 2020 (Aug. 25, 2020), pp. 1-10, XP058477369, DOI: 10.1145/3407023.3407075 ISBN: 978-1-4503-8833-7.

Gupta, Hemant et al.; "Onboarding and Software Update Architecture for IoT Devices", 2019 17th International Conference on Privacy, Security and Trust (PST), IEEE, Aug. 26, 2019 (Aug. 26, 2019), pp. 1-11, XP033683917, DOI: 10.1109/PST47121.2019.8949023 [gefunden am Jan. 2, 2020].

PCT International Search Report and Written Opinion of International Searching Authority mailed Nov. 8, 2021 corresponding to PCT International Application No. PCT/EP2021/072434 filed Aug. 12, 2021.

* cited by examiner

METHODS AND SYSTEMS FOR CREATING UNIQUELY IDENTIFIABLE SOFTWARE INSTALLATIONS

CROSS-REFERENCES TO RELATED APPLICATIONS

This application is the U.S. National Stage of International Application No. PCT/EP2021/072434, filed Aug. 12, 2021, which designated the United States and has been published as International Publication No. WO 2022/043068 A1 and which claims the priority of European Patent Application, Ser. No. 20/192,875.1, filed Aug. 26, 2020, pursuant to 35 U.S.C. 119(a)-(d).

BACKGROUND OF THE INVENTION

The invention relates to methods and systems for creating a uniquely identifiable software installation.

Above and beyond this the invention relates to methods and systems for onboarding of devices of an automation plant.

Moreover the invention relates to computer programs for carrying out the aforementioned methods, and also to machine-readable data media on which these computer programs are stored, and to data media signals that these computer programs transmit.

In addition the invention relates to apparatuses that each have at least one processor, wherein the processor is embodied and/or configured in such a way as to carry out the aforementioned methods.

Device onboarding is a process in which a network access to the device is provided for the first time, the device is configured, and the device is registered, in a Cloud/in a server for example.

The device can be configured for example by means of installation of a configuration on the device or by means of its activation services.

After the onboarding the device can be used from any location over one or more networks, for example the Internet and local plant network.

Internet of Things products (edge devices, PLCs etc.) and also SCALA systems in general are increasingly the object of cyber attacks ("SCADA incidents", "Industroyer"). Therefore a fully comprehensive integrity protection is indispensable. This includes measures such as protecting the communication links, which require a distribution of operational certificates (for example TLS) for cryptographic protection of communication links (for example http, OPC UA, MQTT). In order to be able to guarantee that no unauthorized third party is hacking into the communication it is necessary that all communication partners are able to be uniquely identified.

Manufacturer Device Certificates (MDC) or Initial device identifiers (IDevID), which are created individually during the manufacturing of the hardware product and are stored permanently in a secure memory, can be employed in relation to embedded runtime components, for example edge devices or PLCs. These thus represent a function of a birth certificate. These are not able to be transferred to software entity installations however, since these are only installed by the customer and/or device manufacturer employees at the customer and not hi a protected device production environment.

The object underlying the invention can thus be seen as making it possible to uniquely identify an (actual) software installation, in particular a software installation from the engineering system context.

SUMMARY OF THE INVENTION

The object of the invention is achieved in accordance with the invention with a method stated at the outset, for an installation of software, preferably of configuration software installed on a machine-readable medium, for example on a hard disk of a computer, in particular of engineering system software (engineering station software), by a key pair consisting of a private and a public key being generated, by random numbers supplemented with installation-specific data of the software installation being used for generation of the key pair, by the generated private key being stored securely, for example linked to hardware or software.

The fact that the random numbers are supplemented with installation-specific data of the software installation and these random numbers supplemented in such a way serve as initialization values for the creation of a cryptographic private key means that the software installation is given a unique fingerprint. Above and beyond this a cloning of the software installation is rendered more difficult by this.

The invention thus makes possible a software-linked "device provisioning" for example. As well as the initiation of entity-specific protected communication links, this also opens up software entity-specific licensing options, without having to include a hardware-based second factor (dangle).

Within the framework of the present disclosure, software installation is understood as software stored on an actual machine-readable medium, for example on a computer, for example a servers, or on a distributed data processing system, in a Cloud etc.

Within the context of the present disclosure a processor can be a machine or an electronic circuit. A processor can be implemented for example by a CPU unit or by a microprocessor or a microcontroller, for example by an Application-Specific Integrated Circuit (ASIC) or by a digital signal processor, preferably in combination with a machine-readable (memory) medium for storage of program code etc. As an alternative or in addition, a processor can be implemented by an Integrated Circuit (IC), especially by a Field Programmable Gate Array (FPGA), by an ASIC or by a Digital Signal Processor (DSP) or by a Graphic Processing Unit (GPU). As an alternative or in addition a processor can be implemented by a virtual processor or a virtual machine or by a soft CPU. A processor can be implemented by a programmable processor, which has configuration interfaces which make the configuration of different methods described here easier. The programmable processor can be configured to implement the method steps, components, or other aspects of the methods described herein.

In one form of embodiment there can advantageously be provision for the installation-specific data to comprise a time of the installation (for example date, time of day (with seconds)) and/or specifications about the working memory available at the time of the individualization (for example with "systeminfo" in Windows, with "free" in Linux) and/or a system start time (for example with "systeminfo" in Windows, with "uptime" in Linux).

In this case the cloning of the software installation can additionally be rendered significantly more difficult when the installation-specific data comprises the time of the installation, the specifications about the working memory available at the time of the individualization and the system start time, preferably consists of said data.

In one form of embodiment there can advantageously be provision for the key pair to be generated based on elliptic curves, preferably on isagenies of the elliptic curves, in particular on isogenies or the supersingular elliptic curves.

In one form of embodiment it can be advantageous for the software to be embodied as software for configuration of digital twins.

Above and beyond this the object is achieved in accordance with the invention with a computer program mentioned above, by the program comprising commands that, when the program is executed by a computer, cause said computer to carry out the aforementioned method.

Moreover the object is achieved in accordance with the invention with a system stated at the outset, by the system comprising a machine-readable medium (for example a hard disk of a computer), on which a software installation of software, preferably of configuration software, especially of an engineering system software (engineering station software) is present (is or has been installed) and a securely stored private key assigned to the software installation, generated based on random numbers, preferably with entropy, supplemented with installation-specific data of the software installation. The private key can be stored for example on the aforementioned hard disk or on the computer that comprises this hard disk. Storage of the private key in a Cloud or in a distributed ledger network, for example a blockchain, is likewise conceivable.

A random number having an entropy is understood within the framework of the present disclosure as a random number that has an entropy different from 0. In this case the level of the entropy of the application can be selected appropriately.

In addition the object is achieved in accordance with the invention with a device onboarding method mentioned above, by a software installation being provided with a key pair consisting of a private and a public key in accordance with the aforementioned method, by the software setting up a trustworthy communication to the device, by the device being configured by means of the software installation, and by the public key being transferred to the device, preferably encrypted.

In one form of embodiment it can be expedient for the device to be embodied as an embedded device, for example a runtime or an IoT device or as a digital twin.

When the device is embodied as a digital twin, which represents a purely virtual emulation of a machine, the aforementioned software can be software for configuring such a digital twin. Through a unique identifiability of the software installation a unique identification of digital twins is also possible.

In one form of embodiment it can be appropriate for the device to comprise a whitelist, in which the public key is entered.

The object is moreover achieved in accordance with the invention with the onboarding computer program stated at the outset by the program comprising commands that, when the program is executed by a computer, cause said computer to carry out the aforementioned device onboarding method.

Furthermore the object is moreover achieved in accordance with the invention with the onboarding system stated at the outset by the onboarding system comprising a device of an automation plant and the aforementioned system, wherein the system further has a processor, which is embodied and/or configured in such a way as to carry out the onboarding of the devices in accordance with the aforementioned method. The processor in this case can for example process commands that are contained in the aforementioned onboarding computer program, wherein the onboarding computer program can be comprised by the onboarding system or can be provided via remote access, in a Cloud for example.

Above and beyond this the object is achieved by one or more data medium signals, which transmit one or more of the computer programs mentioned above. In this case different signals can transmit different computer programs (onboarding computer program or computer program etc.).

The data medium signals that transport the aforementioned computer program(s) can be embodied as electronic, magnetic, magnetoelectronic, optical or optoelectronic signals. The data medium signals are defined by any given digital signal sequence. The signal sequence can be stored on a (volatile or non-volatile) computer-readable memory medium. This enables the computer programs mentioned above to be transmitted for example from a Cloud or from another network to a computer of the aforementioned system or onboarding system and be installed on this for example.

For example the data medium signal can be embodied in such a way that an automation plant as described above, especially a system/onboarding system as described above, can be expanded retrospectively with one or more programs as described above. The data medium signal can in this case be transmitted wirelessly by the device manufacturer or by another provider, for example a software provider, and copied into the automation plant.

BRIEF DESCRIPTION OF THE DRAWING

The invention will be described and explained in greater detail below with the aid of the exemplary embodiments shown in the figures. In the figures.

DETAILED DESCRIPTION OF PREFERRED EMBODIMENTS

Figure 1:
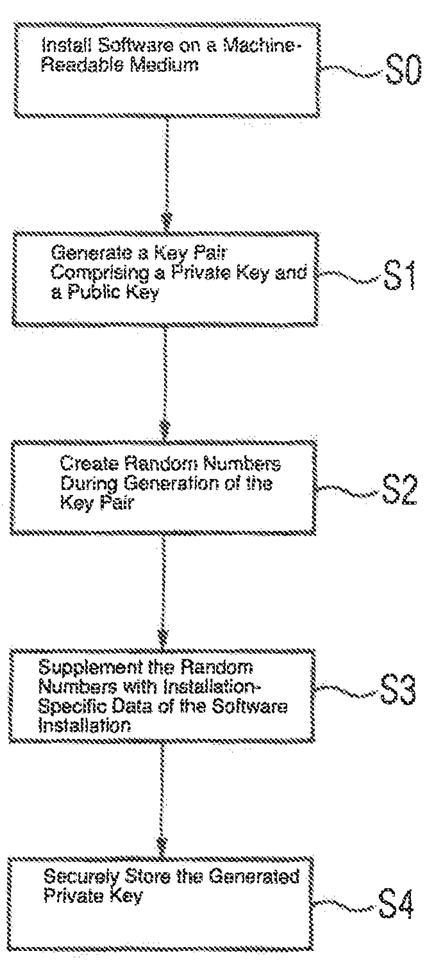
FIG. 1 shows a flow diagram of a method.
Figure 2:
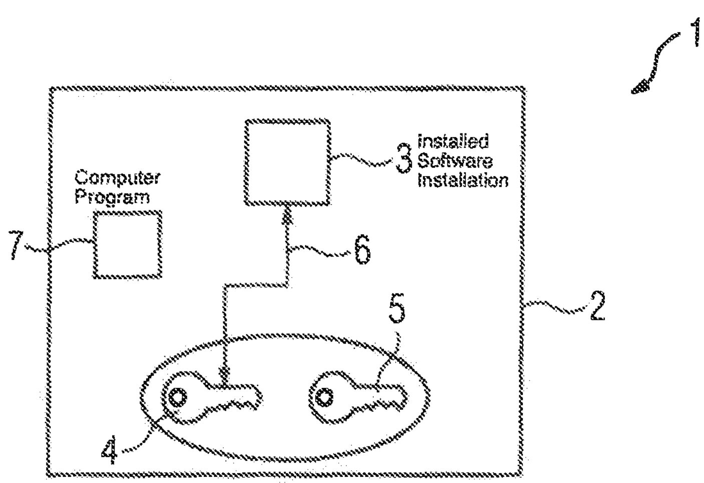
FIG. 2 shows a system for creating uniquely identifiable system installations.

FIG. 1 shows a flow diagram in which a method for creating a uniquely identifiable software installation that corresponds to the inventive method is illustrated There is to be a software installation 3 of software on a machine-readable medium 2, for example on a hard disk of a computer (of. FIG. 2). The software preferably involves industrial software, in particular configuration software, for example engineering system software or engineering station software.

In order to receive the software installation 3 on the machine-readable medium 2, the software can for example be installed on the machine-readable medium 2 in a step S0.

In a step S1 a key pair consisting of a private key 4 and a public key 5 is generated for the installed software installation 3.

During generation of the key pair 4, 5 first of all random numbers, preferably with entropy, in particular AlS31-conformant random numbers, are created—step S2. Such random numbers, which have a sufficient entropy for generating a key pair, can be created with the aid of a crypto library, for example OpenSSL. In this case reliable noise sources can be included.

In a step S3 the random numbers created as described above are supplemented with installation-specific data of the software installation 3.

The installation-specific data in this case can comprise a time of the installation (for example date, time of day (with seconds for example)) and/or specifications about the working memory available at the time of the individualization (for example with "systeminfo" in Windows, with "free" in Linux) and/or a system start time (for example with "systeminfo" in Windows, with "uptime" in Linux).

In particular the installation-specific data can comprise the time of the installation and the specifications about the working memory available at the time of the individualization and the system start time. Preferably the installation-specific data consists of the time of the installation and the specifications about the working memory available at the time of the individualization and the system start time.

The aforementioned random numbers supplemented with the installation-specific data serve below as initialization values for the generation of the key pair 4, 5 and in particular of the cryptographic private key 4. Thus the software installation 3 is given a fingerprint that contains the specific data of this installation, which is only accessible to third parties with great difficulty, if at all.

The private key 4 can for example follow an asymmetrical crypto algorithm, which is currently deemed by recognized institutions as being sufficiently safe with regard to the lifetime to be expected of the respective software installation 3.

For example the key pair can be generated based on elliptic curves, preferably on isogenies of the elliptic curves, in particular on isogenies of the supersingular elliptic curves. ECC (Elliptic Curve Cryptography) is deemed to be especially safe and more efficient by comparison with RSA in respect of the key length, Above and beyond this crypto systems with public keys that are based on isogenies between supersingular elliptic curves can be quanta resistant, i.e. resistant to attacks of a party that has access to a quantum computer and can use this to hack the key.

In a step S4 the created private key 4 is stored securely, for example hardware or software-linked.

For example the private key 4 can be stored on a hardware cryptochip or stored via a Microsoft Cryptography API or stored using a vault product.

FIG. 2 shows a system 1 that comprises the machine-readable medium 2. It can be seen from FIG. 2 that the software installation 3 is installed on the machine-readable medium 2. Moreover the private key 4 assigned to the software installation 3—the assignment is shown by the arrow 6 in FIG. 2—can likewise be stored securely on the machine-readable medium 2. For example the machine-readable medium 2 can comprise the aforementioned hardware crypto chip, so that the private key 4 can be stored there.

Also shown in FIG. 2 is a computer program 7, wherein the computer program 7 comprises commands that, when the program 7 is executed by a processor or computer (not shown), causes the latter to carry out steps S0 to S4 or 51 to S4 of the aforementioned method.

Figure 3:
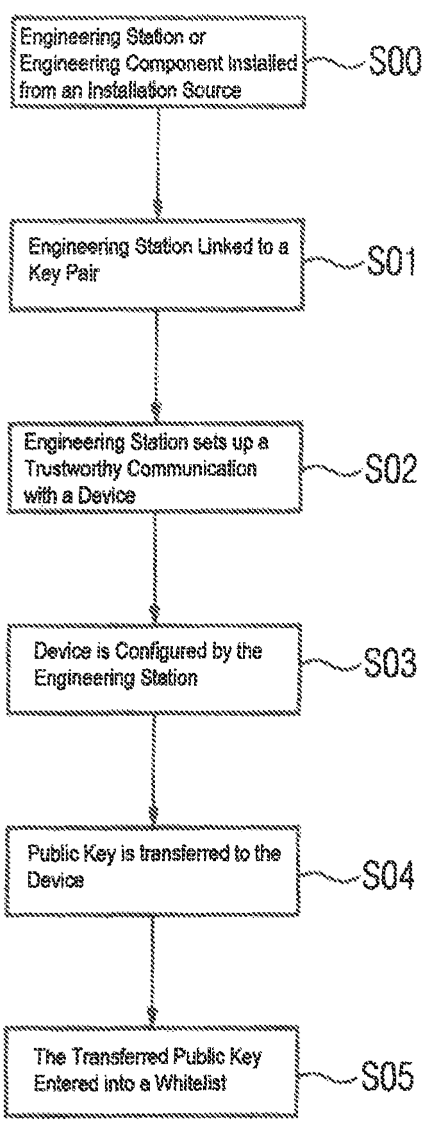
FIG. 3 shows a flow diagram of a device onboarding method.

Shown in FIG. 3 is a device onboarding method for an embedded device of an automation plant, which corresponds to the method for onboarding of a device.

Figure 4:
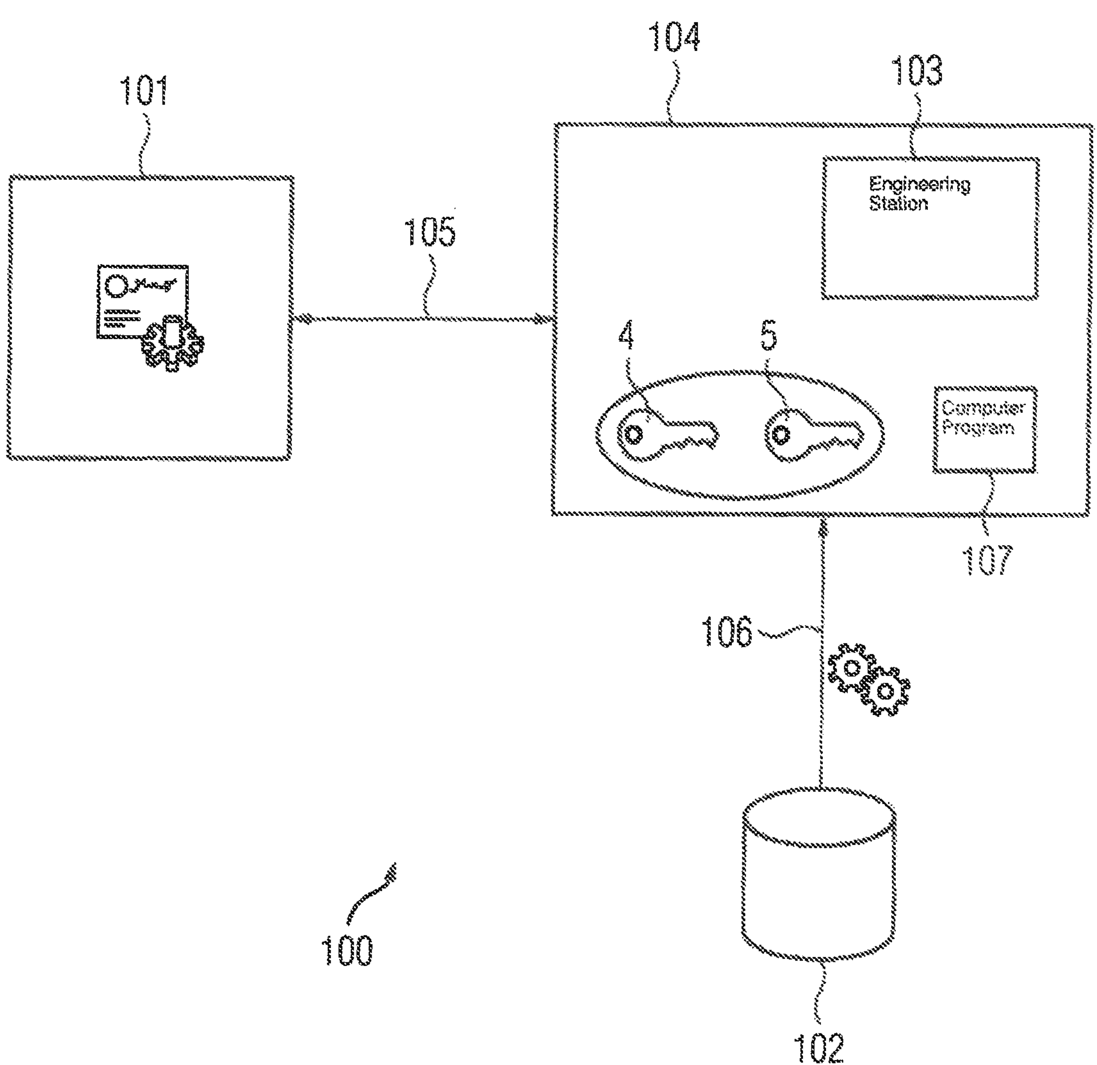
FIG. 4 shows a device onboarding system.

In this method, in an installation step S00, an engineering station 103 or an engineering component can be installed from an installation source 102, for example on a hard disk of a computer 104 (a server or a laptop) (see also FIG. 4, arrow 106). The computer can generally be embodied as a mobile device, for example as a smartphone or a tablet or as a stationary computer or as a virtual computer in a Cloud/network infrastructure.

In a step S01 the engineering station 103 is linked to a key pair 4, 5 consisting of a private key 4 and a public key 5, wherein the keys 4, 5 contain a fingerprint of installation-specific data of the engineering station 103 and thereby make the latter uniquely identifiable. The step S01 can for example comprise the aforementioned steps S1 to S4 of FIG. 1.

The installation-specific data preferably comprises the time of the installation, the specifications about the working memory available at the time of the individualization and the system start time.

In a step S02 the engineering station 103 sets up a trustworthy communication 105 or a trust relationship with a device 101.

In a step S03 the device 101 is configured by means of the engineering station 103.

In a step S04 the public key 5 is transferred to the device 101. The transmission preferably takes place in an encrypted manner.

The device 101 can comprise a whitelist. In an optional step SOS the transferred public key 5 can be entered into this whitelist. This enables the device 101 to set a condition about which engineering stations 103 and in general which software installations it can trust and thus to which engineering stations or software installation it may establish a connection.

FIG. 4 shows a device onboarding system 100, which corresponds to an inventive onboarding system. The device onboarding system 100 has means and is configured for carrying out the method described with regard to FIG. 3. The device onboarding system 100 comprises the device 101 and the computer 104, on which the uniquely identifiable engineering station 103 along with the key pair 4, 5 is present.

Above and beyond this the computer 104 can comprise a computer program 107, wherein the computer program 107 comprises commands that, when the program 107 is executed by a computer 104, cause said computer to carry out the aforementioned method steps S01 to S04 and optionally SOS.

As already mentioned, the device 101 can be embodied as an embedded device. In particular the embedded device can be designed as a runtime or an IoT device or as a digital twin and for example have a device ID and/or Manufacturer Device Certificate (MDC) and/or further manufacturer-specific specifications. One or more of these specifications can be prescribed for example by standards, such as for example IEEE 802.1AR 2018 or by manufacturer-specific standards. Use of such specifications (device ID, manufacturer device certificate, etc.) can for example be of advantage when setting up the aforementioned trust relationship.

In the exemplary embodiments and figures elements that are the same or work in the same way are each provided with the same reference characters.

Although the invention has been illustrated and described in greater detail by preferred exemplary embodiments, the invention is not restricted by the disclosed examples. Variations can be derived herefrom by the person skilled in the art without departing from the scope of protection of the invention, as is defined by the subsequent claims. In particular the features described in conjunction with the methods can be employed mutatis *mutandis* for the systems and vice versa.

What is claimed is:

1. A method for creating a uniquely identifiable software installation, the method comprising:

installing a software installation of software on a machine-readable medium;

generating a key pair comprising a private key and a public key for the installed software installation of software;

creating random numbers during generation of the key pair;

supplementing the created random numbers with installation-specific data of the software installation;

generating the private key based on the random numbers supplemented with the installation-specific data, wherein the private key is configured to allow for software-entity-specific licensing options without including a hardware-based second factor dongle; and securely storing the generated private key.

2. The method of claim 1, wherein the installation-specific data comprises a time of the software installation and/or specifications about working memory available at the time of the software installation and/or a system start time.

3. The method of claim 1, wherein the software installation-specific data comprises a time of the software installation and/or specifications about working memory available at the time of the software installation and the system start time.

4. The method of claim 1, wherein the installation-specific data include of a time of the software installation and/or specifications about working memory available at the time of the software installation and the system start time.

5. The method of claim 1, further comprising creating the key pair based on elliptic curves.

6. The method of claim 5, further comprising creating the key pair based on isogenies of the elliptic curves.

7. The method of claim 5, further comprising creating the key pair based on isogenies of supersingular elliptic curves.

8. The method of claim 1, wherein the software is embodied as software for configuration of digital twins.

9. A non-transitory machine-readable storage medium on which a computer program is stored, the computer program comprising commands that, when the computer program is executed by a computer, cause the computer to carry out a method as set forth in claim 1.

10. A system comprising a data medium signal, which transmits a computer program as set forth in claim 9, and a non-transitory machine-readable storage medium on which the computer program is stored.

11. The method of claim 1, wherein the random numbers have entropy.

12. A method for onboarding of a device of an automation plant, the method comprising:

providing a software installation with a key pair comprising a private key and a public key in accordance with a method of claim 1;

setting up a trustworthy communication between the device and the software installation;

configuring the device by the software installation; and transferring the public key to the device.

13. The method of claim 12, further comprising transferring the public key in an encrypted manner to the device.

14. The method of claim 12, wherein the device is embodied as an embedded device.

15. The method of claim 14, wherein the embedded device is designed as a runtime or an loT device or as a digital twin.

16. The method of claim 12, wherein the device comprises a whitelist into which the public key is entered.

17. A non-transitory machine-readable data media on which a computer program is stored, the computer program comprising commands that, when the computer program is executed by a computer, cause the computer to carry out a method as set forth in claim 12.

18. An onboarding system, comprising:

a device of an automation plant; and a system comprising a machine-readable storage medium on which a software installation of software is present and a private key assigned to the software installation, the private key created based on random numbers supplemented with installation-specific data of the software installation, is securely stored, wherein the system further comprises a processor, which is embodied in such a way and/or which is configured to carry out the onboarding of the device according to the method of claim 12.

19. Apparatus comprising a processor, the processor embodied and/or configured to carry out a method as set forth in claim 12.

20. Apparatus, comprising a processor, the processor embodied and/or configured to carry out a method as set forth in claim 1.

21. The apparatus of claim 20, wherein the processor is implemented as a virtual processor, a virtual machine, or a soft CPU.

22. The method of claim 1, wherein the private key is configured to be software entity-specific.

* * * * *